Oct. 13, 1964  F. B. PORGES  3,152,807
MECHANICAL SEALS WITH INSPECTION MEANS
Filed Oct. 18, 1961  3 Sheets-Sheet 2

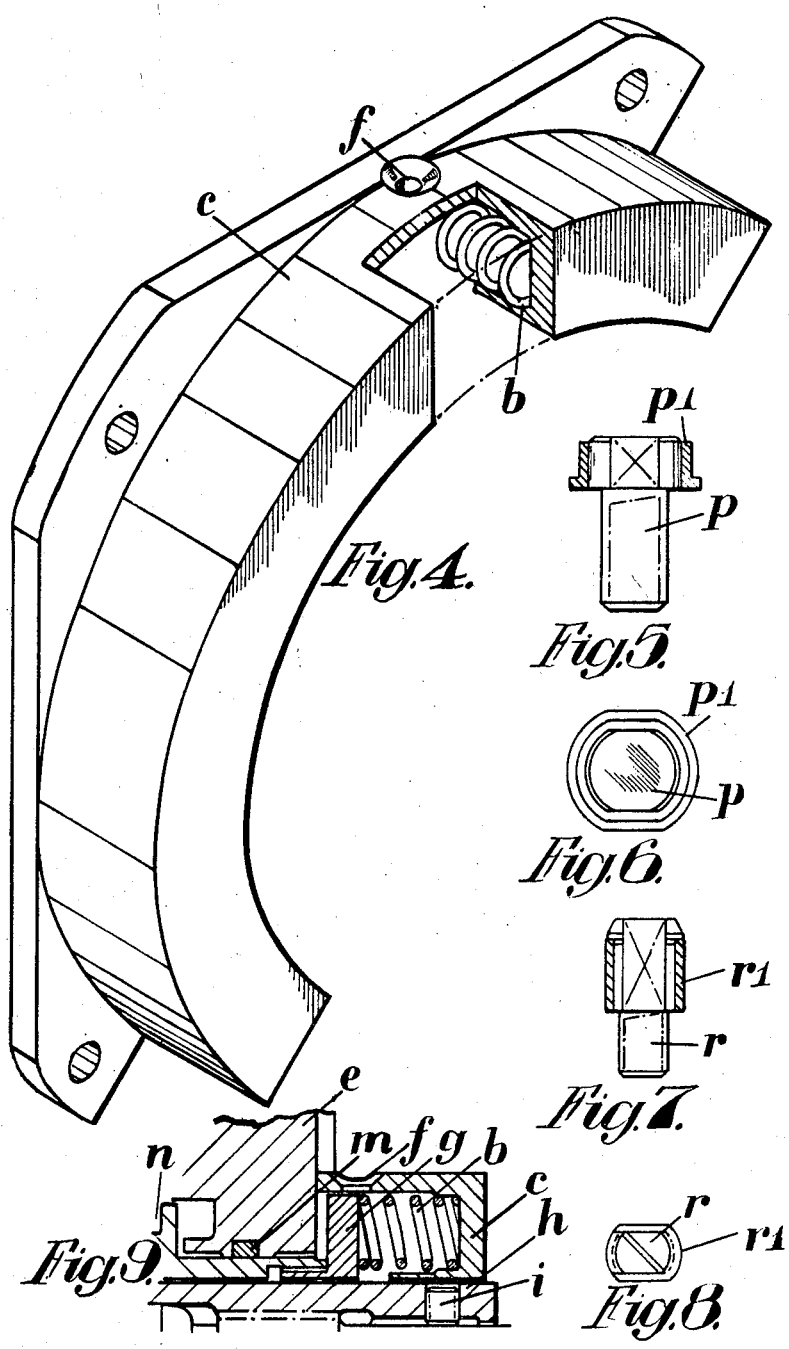

United States Patent Office 3,152,807
Patented Oct. 13, 1964

3,152,807
MECHANICAL SEALS WITH INSPECTION MEANS
Frederick Benjamin Porges, Hale Barns, England, assignor to Flexibox Limited, Manchester, England, a British company
Filed Oct. 18, 1961, Ser. No. 145,899
Claims priority, application Great Britain Oct. 24, 1960
4 Claims. (Cl. 277—2)

This invention relates to mechanical seals for revolving shafts and particularly to such seals when applied to pump and like shafts revolving at very high circumferential speeds where centrifugal forces may produce undesirable effects.

The object of the present invention is to provide an improved mechanical seal which is compact in respect of its length and diameter and obviates undesirable effects due to unbalanced centrifugal forces.

The invention consists in a mechanical seal for a revolving pump or like shaft comprising a stationary seal ring and a rotary seal ring, in which the stationary seal ring is loaded axially by springs disposed in the atmosphere at the outside end of the seal, the springs being located axially in recesses or pockets in two similar spring mounting plates extending around the seal and detachably secured to a seal plate bolted to the pump or like housing, the springs bearing upon an annular pressure plate which applies pressure to the outer end of the stationary seal ring, inspection holes in the spring mounting plates enabling the position of the annular pressure plate to be examined even whilst the shaft is revolving.

The invention further comprises a mechanical seal as aforesaid in which the seal plate has connections therein for delivering cooling water around the stationary seal ring to the pump inlet and a connection for ventilating the cooling system at starting.

The invention further comprises a mechanical seal as aforesaid in which the stationary seal ring is restrained against rotary but not axial movement in close proximity to its seal face.

The invention further comprises a mechanical seal as aforesaid in which the rotary seal unit is threaded on to the shaft and prevented from turning by studs therein bearing upon the shaft.

The invention further comprises a mechanical seal as aforesaid in which the annular pressure plate is secured to the outer end part of the stationary seal ring.

Referring to the accompanying explanatory drawings:

FIGURE 4 is a detail view with part in section of one of the parts shown in FIGURES 1–3.

FIGURES 5 and 6 are detail views at right angles to one another of the locating screws in the stationary seal ring shown in FIGURE 2.

FIGURES 7 and 8 are detail views at right angles to one another of the locating screws of the rotary seal ring as shown in FIGURE 2.

FIGURE 9 is a detail view on the line 9—9 of FIGURE 1.

Figure 3:
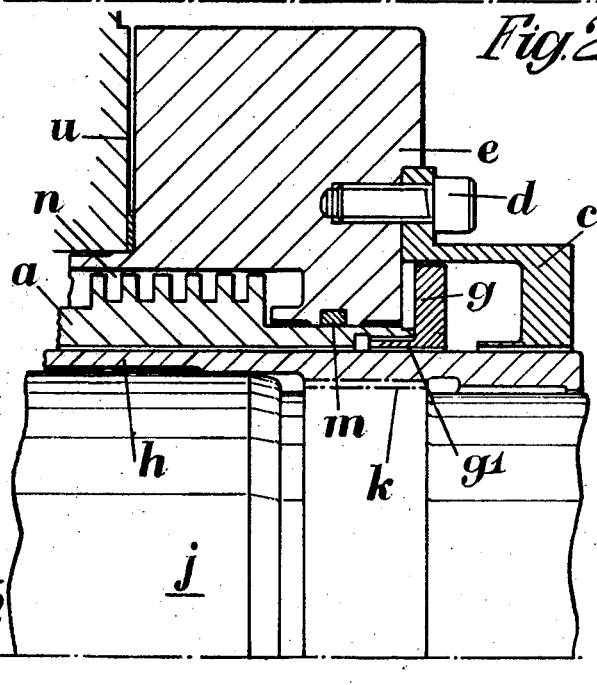
FIGURE 3 is a part sectional view on the line 3—2 of FIGURE 1.

The mechanical seal illustrated comprises a stationary seal ring $a$ which is loaded by springs $b$ located in recesses or pockets in two spring mounting plates $c$ detachably secured by screws $d$ to the part $e$ termed the seal plate. FIGURE 3 shows a mounting plate $c$, which in the example illustrated has eight springs $b$ in recesses or pockets therein and there is an inspection hole $f$ (see FIGURE 9) in each spring mounting plate. The springs $b$ bear upon an annular pressure plate $g$ consisting of a radial part and of a circular part $g'$ which may screw into the end of the stationary seal ring $a$. The radial part of the plate $g$ is a free fit in a mounting plate $c$ so that it can move under the pressure of the springs $b$. Its position can be inspected through the hole $f$.

The rotary seal member $h$ screws on the shaft $j$ which has a screw threaded part at $k$ and is prevented from turning by screws $i$. There is a packing $m$ between the stationary seal ring $a$ and the seal plate $e$. The external surface of the stationary seal ring $a$ has a multi-spiral groove $n$ therein to assist in dissipating heat from the stationary seal ring to cooling liquid circulated from four inlets $o$ shown in FIGURE 1 and one of which is shown in FIGURE 2, along the stationary seal ring $a$ to the inlet to the impeller (not shown) on the pump shaft $j$. The cooling liquid is extracted from the pump delivery and returned to the pump inlet. It is the product being sealed which is circulated for cooling purposes.

The springs $b$ are open to the atmosphere and can be readily examined and if desired changed by removing the mounting plate $c$.

There are two studs $p$ secured in the stationary seal ring at diametrically opposite points, with packing washers $p'$ thereon (see FIGURES 5 and 6) where the studs pass into slots in the sleeve like extension of the seal plate $e$. This arrangement prevents the stationary seal ring from turning and is located as near as practicable to the seal face of the ring. It does not interfere with free axial movement of the stationary seal ring in accordance with wear of the interengaging faces of the stationary and rotary seal rings.

The rotary seal ring assembly comprises the part $h$ which threads on to the shaft $j$ and is prevented from turning by studs $i$, the part $q$ which fits around the end of the part $h$ and is prevented from turning relatively thereto by two studs $r$ with packing washers $r'$ therearound (see FIGURES 7 and 8) which screw into the part $h$ at diametrically opposite points and pass into slots in the part $q$, and the seal ring $s$ against which the seal face of the stationary seal ring $a$ bears.

The inspection holes $f$ in the outer faces of the spring mounting plates $c$ make the outer edges of the pressure plates visible so that even whilst the shaft $j$ is revolving, it is possible to ascertain whether the seal is in correct working position and whether the rotary seal ring $s$, which may be a carbon ring, has unduly worn. If desired only one inspection hole may be provided.

The part $h$ of the rotary seal ring assembly may have a fitting mark as shown as $t$ in FIGURE 2 on its peripheral edge between its point of attachment to the pump shaft $j$ and the point of attachment thereto of the seal ring $s$ and part $q$, such mark when assembling the mechanical seal being lined up with the end face $u$ of the pump housing to which the seal plate $e$ is bolted. This serves to locate the member $h$ axially during assembly.

Figure 1:
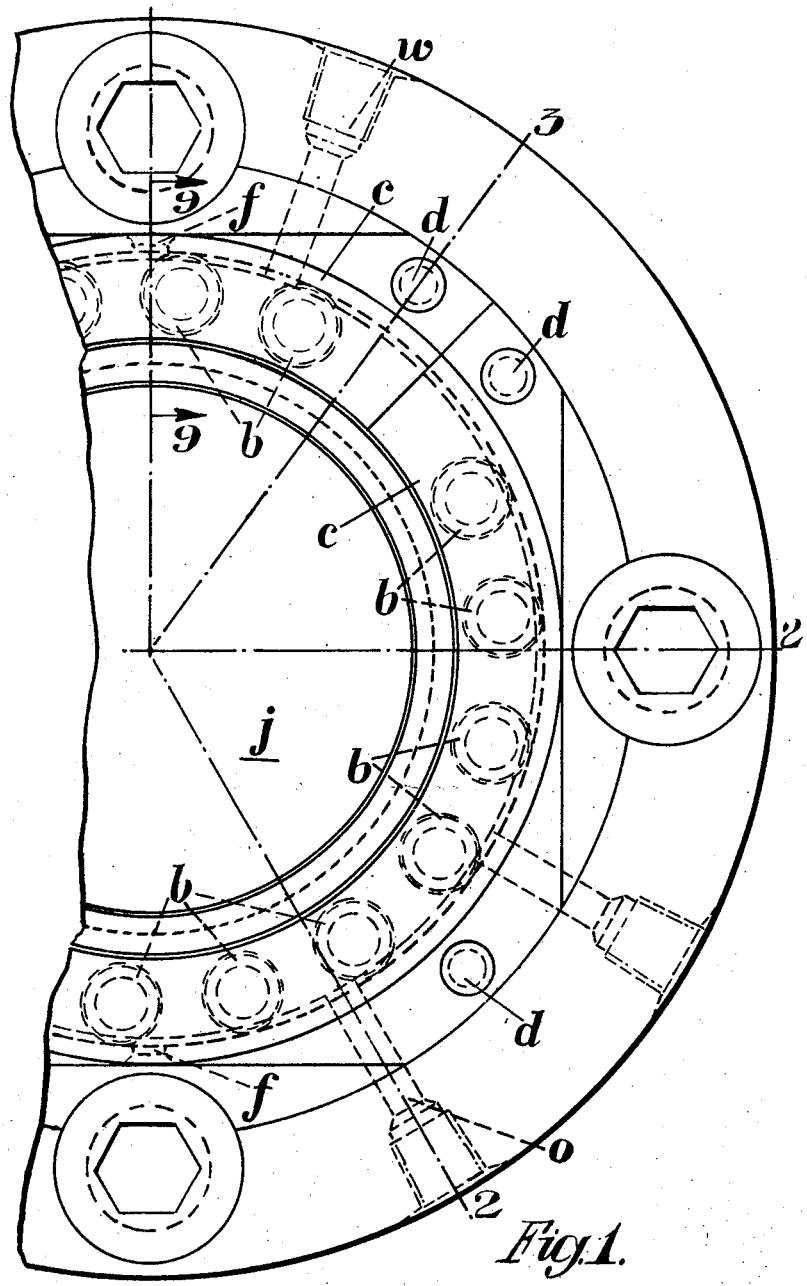
FIGURE 1 is an end view of part of a seal assembly upon a rotary shaft in accordance with this invention.
Figure 2:
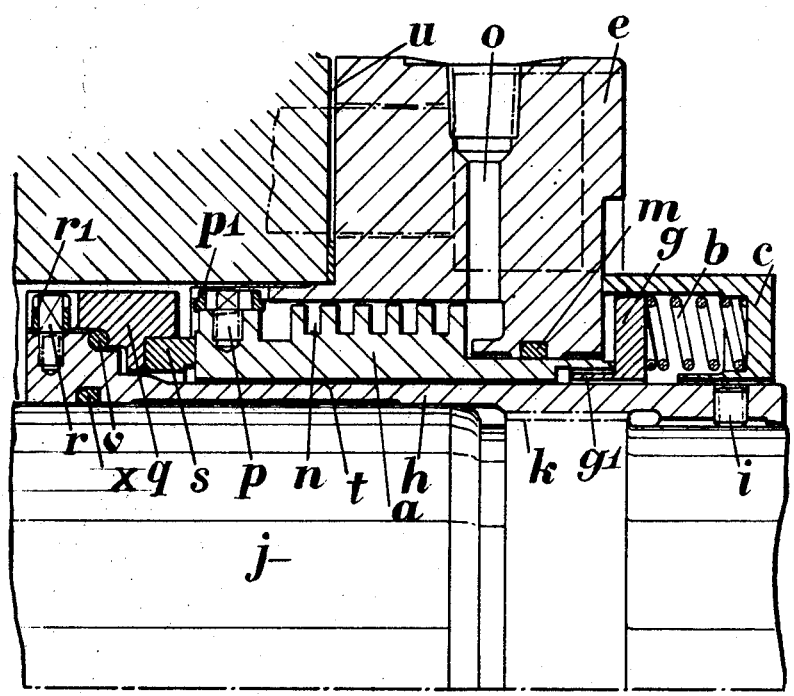
FIGURE 2 is a sectional view on the line 2—2 of FIGURE 1.

There is a radial nozzle at $w$, FIGURE 1, which can be used for ventilating the cooling circulation system of the mechanical seal at starting to prevent airlock therein. This nozzle is closed by a plug after the seal has commenced to operate.

By our improved construction we provide for the inspection and renewal of the springs $b$ without dismantling any part of the seal other than the mounting plates $c$, for the checking of the seal whilst it is in operation through the inspection holes $f$ to ascertain that the sealing faces are in correct working position and also for the effective cooling of a large area of the stationary seal ring and of the rotary seal ring.

We provide the usual packing ring at $x$ between the rotary seal ring assembly and the shaft $j$ within and at $v$ between the part $q$ having the rotary seal ring $s$ therein and the part $h$ of the rotary assembly in which it is secured.

What is claimed is:

1. A mechanical seal for a revolving shaft, comprising a stationary seal ring, a rotary seal ring in contact with the stationary seal ring, a rotary seal member secured to the shaft and carrying the rotary seal ring, a shaft housing, a seal plate secured to the exterior of the shaft housing, the stationary seal ring extending through the seal plate to the exterior thereof, spring mounting plates extending around the seal and secured to the exterior of the seal plate, springs located axially in the spring mounting plates, an annular pressure plate coaxial with the shaft and secured to the end of the stationary seal ring remote from the rotary seal ring, the springs bearing on the annular pressure plate to load the stationary seal ring and press it against the rotary seal ring, and inspection holes in the spring mounting plates enabling the position of the annular pressure plate to be examined even while the shaft is revolving.

2. A mechanical seal as claimed in claim 1, and having ducts in the seal plate for admitting coolant to the space around the stationary seal ring.

3. A mechanical seal as claimed in claim 1, and having a sleeve-like extension of the seal plate surrounding the stationary seal ring and studs fixed in the seal ring and passing through axial slots in the seal plate extension, to prevent the seal ring from turning.

4. A mechanical seal as claimed in claim 1, having the rotary seal member threaded on to the shaft and having studs fitted in it and bearing on the shaft for preventing relative rotation between the rotary seal member and the shaft.

References Cited in the file of this patent

UNITED STATES PATENTS

| 793,623 | Bowen | June 27, 1905 |
| 2,687,096 | Armacost | Aug. 24, 1954 |

FOREIGN PATENTS

| 527,640 | Great Britain | Oct. 14, 1940 |